UNITED STATES PATENT OFFICE.

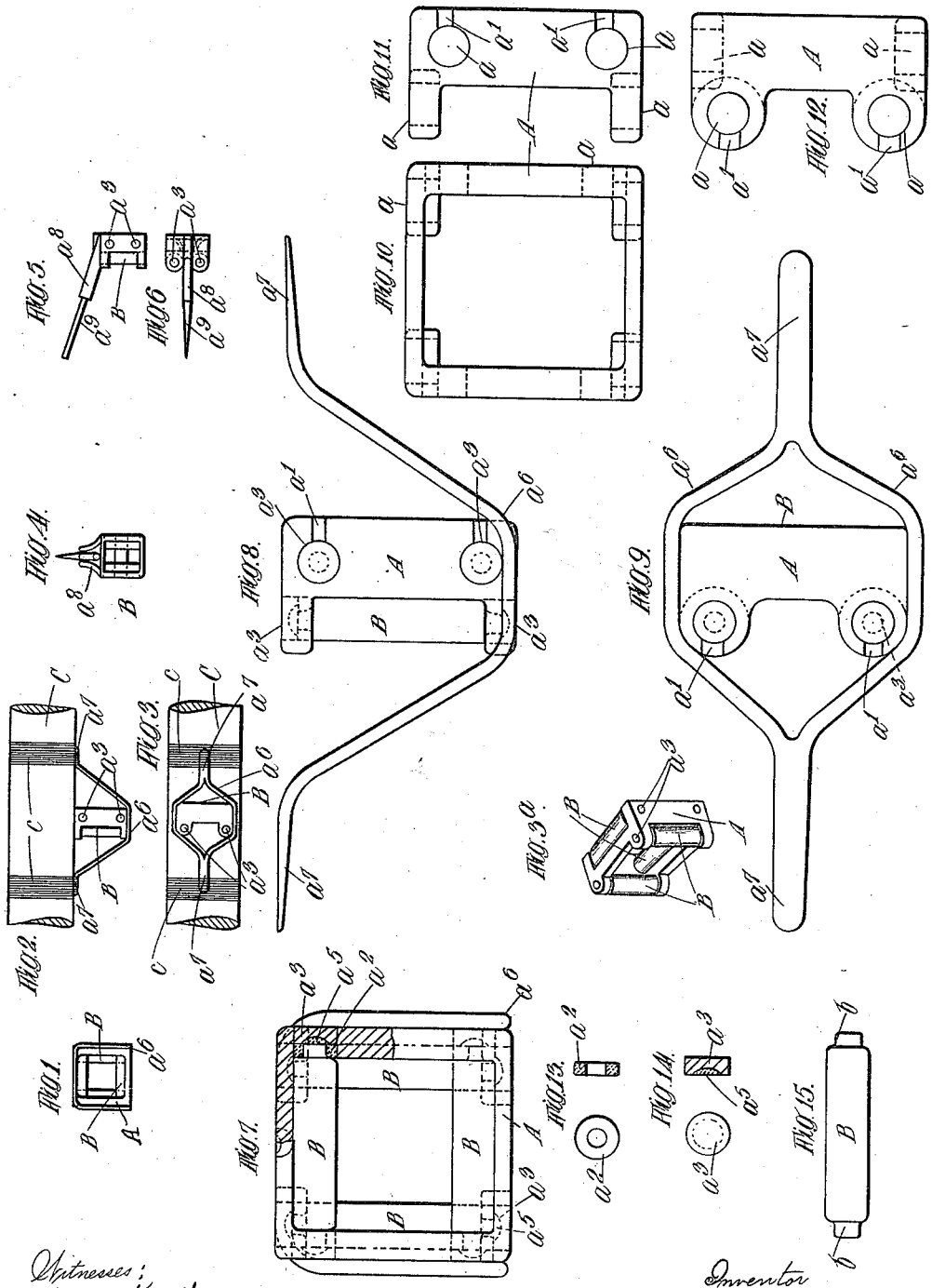

THOMAS DELANO WHISTLER, OF PIMLICO, LONDON, ENGLAND.

FISHING-ROD.

1,063,402.　　　Specification of Letters Patent.　　Patented June 3, 1913.

Application filed September 7, 1911.　Serial No. 648,155.

*To all whom it may concern:*

Be it known that I, THOMAS DELANO WHISTLER, a citizen of the United States of America, residing at 128 Ebury street, Pimlico, in the county of London, England, have invented certain new and useful Improvements in or Relating to Fishing-Rods, of which the following is a specification.

This invention relates to fishing rods, and has for its chief object to facilitate the passage of the line through the rings, and also to reduce the cutting action that the line exerts upon such rings during its passage therethrough.

Various devices have hitherto been employed in connection with fishing rod rings for presenting a smooth hard surface, or a rolling surface to the line for the purpose of reducing friction and the aforesaid cutting action and among the devices provided with rolling surfaces it has been proposed to construct a ring with two rollers situated one above the other. This arrangement is only capable of reducing friction when the line is running over one or other of the rollers and it will be obvious that in many cases, such for example as when the line is influenced by a side wind, or if the rod is at any time held in a position in which the rings are not vertical with the axis of the rod, the line will bear partly or wholly against the fixed sides of the rings and the rollers will be inoperative.

According to this invention each of the rings comprises a frame that carries a number of rotatably mounted members, hereinafter referred to as rollers, which completely surround or encompass the space through which the line passes and are so arranged that one or more of such rollers present a rolling surface to the line as it passes through the ring.

In order that my said invention may be clearly understood and readily carried into effect, the same is described more fully with reference to the accompanying drawings, in which:—

Figure 1 is an end elevation. Fig. 2 is a side elevation, and Fig. 3 a plan of an intermediate or butt ring constructed in accordance with this invention. Fig. 3$^a$ is a perspective view of the frame and the rollers which form the roller bearings. Figs. 4, 5 and 6 are similar views of an end ring. Fig. 7 is an end elevation partly shown in section of an intermediate or butt ring drawn to a larger scale. Fig. 8 is a side elevation of Fig. 7. Fig. 9 is a plan of Fig. 8. Figs. 10, 11, 12 are details of the frame for carrying the aforesaid rollers. Figs. 13 and 14 are sections showing detached parts of one of the roller bearings, and Fig. 15 is a detached view of one of the rollers.

A represents the ring frame and B the rollers. In the example shown the frame A is of rectangular formation and is formed with apertures $a$ for the reception of the roller bearings and with slots $a'$ for the insertion of journal pins $b$ formed on the rollers B. Four of such rollers are employed and are supported by their journal pins in bearings of the jewel type. Each of such bearings comprises an agate or other suitable ring $a^2$ which encircles the journal pin $b$ and is maintained in position within the aperture $a$ by a cap $a^3$ carrying an agate or other suitable stone to act as an end bearing $a^5$ for its respective journal pin. This cap is conveniently retained in position within the slotted aperture $a$ by the resilient pressure that the wall of the aperture exerts upon the cap. In order to enable any two adjacent rollers to present a rolling surface to the line when the latter is traveling in contact therewith, one pair of rollers is situated in front of the other pair as indicated in the drawings so that any wedging or binding action of the line at the point of intersection of the rollers is prevented as would otherwise take place if all the rollers were arranged upon the same plane.

Any suitable device may be employed for securing the frame A to the rod C and in the example shown the intermediate or butt ring is soldered or otherwise secured within a wire bridge $a^6$ terminating at its upper ends in flattened pins $a^7$ which are secured to the rod by wrapping $c$ in the ordinary way. The end ring shown in Figs. 4 to 6 is connected to a tube or shank $a^8$ terminating in the usual flattened pins $a^9$ which are secured by wrapping to the end of the rod.

What I claim and desire to secure by Letters Patent of the United States is:—

In a fishing rod ring, a frame formed with slotted apertures, jewel bearings situated therein, rollers having journal pins supported in such bearings, and means for connecting the frame with the fishing rod.

In testimony whereof I affix my signature in presence of two witnesses.

THOMAS DELANO WHISTLER.

Witnesses:
ERNEST ENTENMANN,
FRIDO KLOIBER.

Copies of this patent may be obtained for five cents each, by addressing the "Commissioner of Patents, Washington, D. C."